Feb. 19, 1946.     O. D. GRANDSTAFF     2,395,116
SURGE SUPPRESSOR CIRCUIT
Filed Sept. 13, 1943
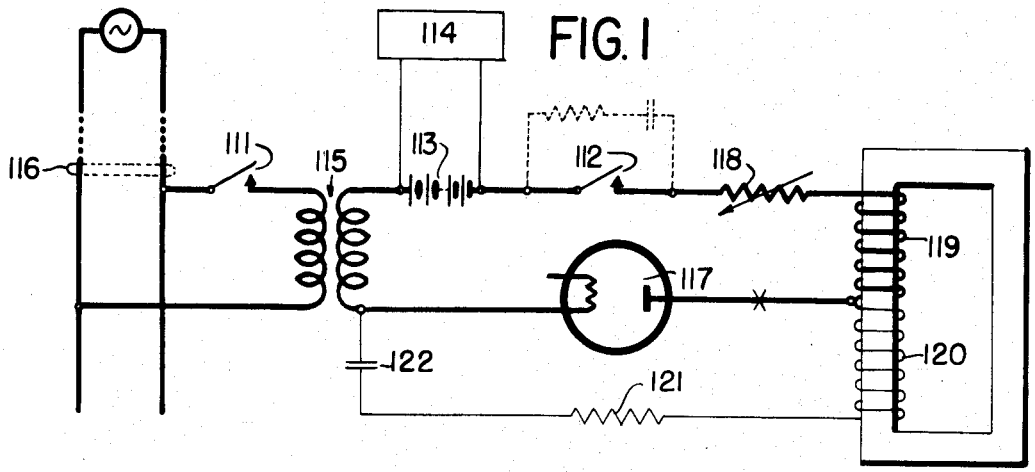
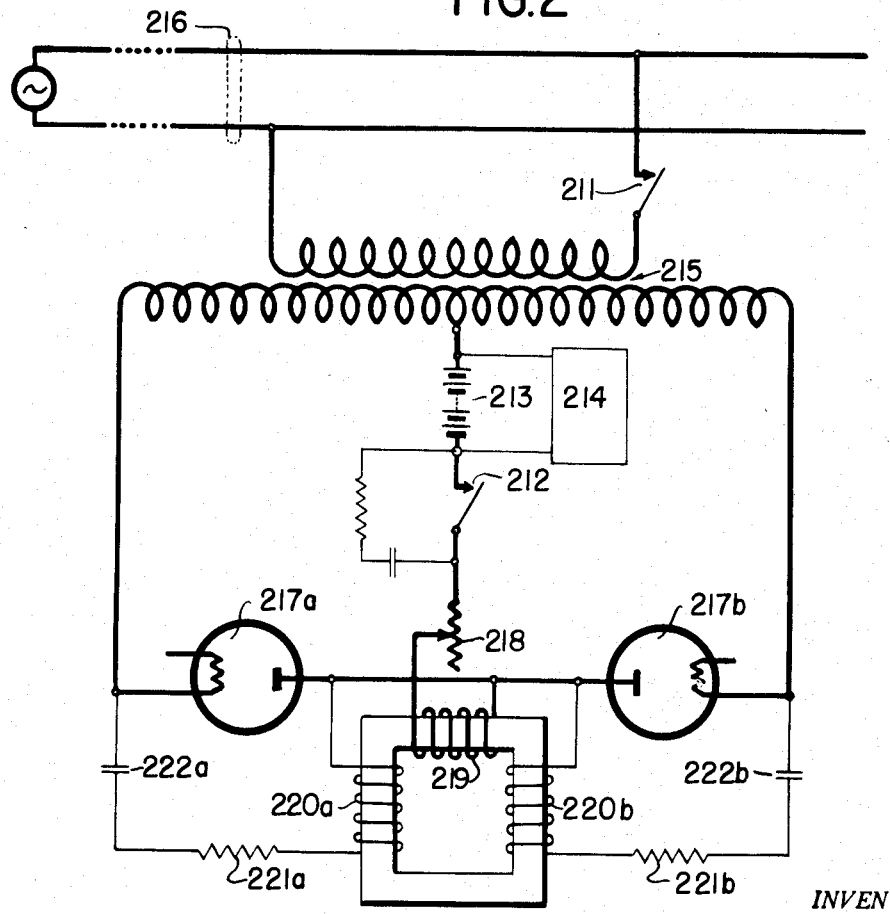
INVENTOR.
OTHO D. GRANDSTAFF
BY
ATTORNEY Patented Feb. 19, 1946

2,395,116

UNITED STATES PATENT OFFICE 2,395,116

SURGE SUPPRESSOR CIRCUITS

Otho D. Grandstaff, Oak Park, Ill., assignor to Automatic Electric Laboratories, Inc., Chicago, Ill., a corporation of Delaware Application September 13, 1943, Serial No. 502,154

6 Claims. (Cl. 175—363)

The present invention relates in general to surge suppressor circuits and more particularly to surge suppressor circuits for systems wherein reactors are used in conjunction with rectifying devices.

In rectifier circuits such as are used to convert alternating current to direct current which is suitable, for example, for charging storage batteries, choke coils frequently are employed in the output of the rectifying devices to smooth the flow of rectified current. It has been observed that the choke coils sometimes give rise to a high inductive surge as a result of certain transient current conditions in the circuit, and this frequently has a detrimental effect upon the associated rectifying devices.

Therefore it is the general object of the invention to provide arrangements for preventing the harm which otherwise would result from the occurrence of such inductive surges.

One feature of the invention is the provision of a choke coil having a filter winding and one or more auxiliary windings for at times neutralizing the effect of said filter winding. Another features is the provision of circuit means for rendering the auxiliary windings effective at times and ineffective at other times. Still another feature is the provision, in a rectifier system containing a reactor, of an arrangement for preventing injury of the rectifying device due to surges occasioned by the reactor.

Further objects and features will be apparent from the following description taken in conjunction with the accompanying drawing which comprises circuit diagrams of two exemplary rectifier systems embodying the invention. More specifically, Fig. 1 shows a half wave battery charger and Fig. 2 shows a full wave battery charger.

Referring first to Fig. 1, the basic charging circuit is indicated by means of heavy lines, and the manner in which it functions is so well known as to require little explanation. Its operation is initiated by closing contacts 111 and 112 either manually or automatically, for instance in response to the state of charge of battery 113 having been reduced to a predetermined level by the direct current load 114. When contact 111 is closed, alternating current is supplied to the primary winding of transformer 115 over a line 116 which will be assumed to be a power main in a commercial power distribution system. Thereupon, an alternating voltage is induced in the secondary winding of the transformer.

Since the gas discharge tube 117 is able to conduct current only in one direction (i.e., from plate to filament) it is effective to block the flow of current throughout half of each alternation of the voltage induced in the transformer's secondary winding; during the other half it permits current to flow in the upper loop, comprising the secondary winding of transformer 115, battery 113, contact 112, variable resistance 118, winding 119 of the filter choke and tube 117 in series. The choke is provided in this loop to smooth the flow of rectified current thereover, while variable resistance 118 is for the purpose of adjusting the magnitude of charging current.

Bridged across the tube 117 is a surge suppressor circuit including, in series, an auxiliary choke coil winding 120, resistance 121 and condenser 122. It will be clear that 121 may either be an independent resistor, as shown, or may represent the internal resistance of winding 120. Condenser 122 overcomes any tendency on the part of battery 113 to cause direct current to flow over the external loop circuit including windings 119 and 120 in series. Moreover its capacity is such as to give the surge suppressor circuit a very high impedance to current of the frequency induced in the secondary winding of transformer 115 during the normal charging operation. Accordingly the surge suppressor circuit has substantially no effect upon normal charging of the battery.

Without this suppressor circuit, it has been observed that a filter choke such as winding 119 tends at times to generate in the battery charging loop inductive surges which may be harmful to tube 117. These surges may be caused by sudden fluctuations of the voltage of line 116 or of the load 114; likewise they may be caused by chattering of contacts 111 and 112, or simply by opening or closing one of these contacts at certain critical points in any given alternation of the line voltage. The counter-electromotive force generated in winding 119 at such times is in a direction dependent upon the character of the transient condition which gives rise to the surge, and hence it tends to cause current to flow over the battery charging loop sometimes in the direction in which tube 117 is adapted to conduct current and other times in the reverse direction. In the latter cases, if the surge voltage is high enough to exceed the inverse peak voltage of the tube, it creates an arc within the tube which, despite the fact that the surge is of transitory nature, thereafter will be sustained by the relatively low voltage of battery 113 until the tube burns out.

The surge suppressor circuit is effective to prevent such injury to the tube, due to the fact that whenever a surge voltage is generated in winding 119 a corresponding voltage is generated in winding 120. As applied to tube 117, these two voltages are in opposite direction, and hence tend to cancel one another; but they cause current presently to flow in the external loop circuit comprising, in series, windings 119 and 120, resistance 121, condenser 122, the secondary winding of transformer 115, battery 113, contact 112 and resistance 118. Because this current is of high frequency character, it will be understood that the surge suppressor circuit offers little impedance to its flow. Resistance 121 is designed to be of such value that the voltage drop occurring therein due to the flow of current is approximately equal to the voltage generated in winding 120, while the voltage drop in the upper branch of the loop circuit is approximately equal to the voltage generated in winding 119. In other words, as to surge voltages, the suppressor circuit completes a balanced bridge with respect to the terminals of tube 117, and consequently the voltage difference produced across the tube due to the transient condition then existing is insufficient to cause the tube to break down.

A special situation deserving mention arises when the surge results from opening contact 112 while tube 117 is conducting current and the induced voltage in the secondary winding of transformer 115 is at or near its peak value. In this case, open contact 112 prevents the circuit from functioning as a balanced bridge in the way indicated above. Accordingly the counter-E. M. F. generated in winding 120 causes tube 117 to "flash back" and conduct current momentarily from filament to plate. This arc will not be sustained however, due to the fact that battery 113 is disconnected from the tube at contact 112, and hence it does no damage.

If desired, arcs even of this last character may easily be eliminated. For example, contact 112 can be shunted by a resistor and condenser in series, as shown dotted; thus the balanced bridge will be maintained even when contact 112 is open. Alternatively, contact 112 could be located in the plate circuit of tube 117, at a point marked X, in which case the surge current would circulate around the external circuit as previously described even when caused by the opening of contact 112.

Turning now to the full wave rectifying system of Fig. 2, it will be apparent that the principle involved is fundamentally the same as that of Fig. 1. Here, however, there are two rectifier tubes which are operative alternately in the well known fashion. During the half cycle in which tube 217a is non-conductive, tube 217b permits the current induced in the right hand section of the secondary winding of transformer 215 to flow from the midpoint of said secondary through battery 213, contact 212, variable resistance 218, winding 219 of the choke coil, tube 217b and back to the right hand end of the secondary. Similarly, during the half cycle in which tube 217b is non-conductive, tube 217a permits the current induced in the left hand section of the transformer's secondary winding to flow from the midpoint of said secondary through battery 213, contact 212, variable resistance 218, winding 219, tube 217a and back to the left hand end of the secondary. Winding 219 smoothes the flow of rectified current from both rectifier tubes, while variable resistance 218 permits adjustment of the charging rate.

Each rectifier tube is shunted by a surge suppressor circuit including a condenser, resistance and an auxiliary winding on the choke coil. Preferably, each of the auxiliary windings has the same number of turns as the filter winding 219, but this is not essential. As explained in connection with Fig. 1, the condensers prevent current of the frequency induced in the secondary winding of transformer 215 in the course of the normal charging operation and direct current from battery 213 from circulating over the respective surge suppressor circuits. However, even if windings 220a and 220b did tend to energize slightly in series with one another from the current of normal charging frequency induced in the secondary winding of transformer 215, this would have no effect upon winding 219, inasmuch as the flux generated in the core of the choke by winding 220a is 180° out of phase with that generated by winding 220b, whereby the two would cancel. Thus it will be seen that the two shunt circuits do not impair the normal function of the filter choke, and that their effect upon battery ripple is negligible. This has been verified by experiment.

As was true in the case of the half wave rectifier, an operation of contacts 211 or 212, or a sudden fluctuation in the load 214 or in the voltage of line 216 may cause a surge voltage to be generated in the filter choke winding 219. When this occurs, each auxiliary winding of the choke functions in the same way as the auxiliary winding of Fig. 1, thereby to protect its associated rectifier tube by neutralizing the surge voltage which otherwise would manifest itself across the terminals of that tube.

Contact 212 is shunted by a condenser and resistor in series, and this, by providing a low impedance path for surge current even when contact 212 is open, prevents either tube from breaking down as the result of surge conditions precipitated by the opening of contact 212. Though such a break down does no damage in a half wave rectifier due to the lack of any means for sustaining the arc beyond the period of the surge, this is not true in a full wave rectifier. It has been found that if either of the tubes 217a and 217b should arc over while contact 211 remains closed (as would frequently happen responsive to the opening of contact 212 if it were not for the shunt circuit around that contact) the arc would be sustained by current flowing from the secondary winding of transformer 215 through the two tubes in series, until it caused the arcing tube to burn out. To guard against this special situation, then, the shunt circuit is essential.

The invention has been shown and described particularly with reference to a battery charging system, but it will be appreciated that this is merely exemplary, the arrangement being equally applicable to battery eliminators and other known rectifier systems. In any such full wave rectifier system a single full wave rectifier tube obviously might be used instead of the pair of half wave tubes illustrated. Moreover, where reactors are employed in systems containing other elements than rectifier tubes which may be affected undesirably or which may produce unwanted results due to surges from the reactor, it will be clear that surge suppressor arrangements of the character disclosed herein may be employed to overcome the defect.

Thus, while the invention has been disclosed as embodied in certain specific arrangements which are deemed desirable, it is understood to be capable of embodiment in many other forms without departing from the spirit of the invention as defined by the appended claims.

What is claimed is:

1. In a rectifier system wherein a rectifier connected to an alternating current supply furnishes rectified current via a reactance coil to a load, and wherein a surge voltage of a polarity to which said rectifier normally is non-conductive is generated at times in said reactance coil, an auxiliary winding on the same magnetic structure as said coil, whereby a surge voltage also is generated in said auxiliary winding whenever one is generated in said coil, and means connecting said auxiliary winding to said rectifier in such a way as to complete a bridge circuit in which surge voltages generated simultaneously in said winding and said coil are balanced against one another to prevent either from producing a substantial voltage difference across said rectifier.

2. A rectifier system as claimed in claim 1, wherein said connecting means includes, in series with said auxiliary winding, a condenser having a high impedance at the frequency of said alternating current supply but low impedance at the frequency of said surge voltages.

3. In a full wave rectifier system wherein two oppositely poled rectifying means associated with a common alternating current supply furnish rectified current to a common load circuit which includes a reactance coil, and wherein a surge voltage is generated at times in said reactance coil, a pair of auxiliary windings on the same magnetic structure as said coil, whereby a surge voltage is generated in each auxiliary winding whenever one is generated in said coil, two circuits connecting said two auxiliary windings respectively to said two rectifying means so that a surge generated in either auxiliary winding neutralizes the tendency of the surge voltage, generated simultaneously in said coil, to produce a difference of potential across the rectifying means, and means rendering said last two circuits substantially opaque to current from said alternating current supply.

4. A system as claimed in claim 3, wherein said last means comprises a condenser having a high impedance at the frequency of said alternating current supply but a low impedance at the frequency of said surge voltages.

5. In a rectifier system, an alternating current supply, a rectifier tube connected to said supply for rectifying alternating current therefrom, a choke coil in the output of said tube for smoothing the flow of rectified current, means for causing transitory inductive surges to be generated in said choke coil in such a direction as to tend to cause said tube to flash back, and an auxiliary winding on the same magnetic structure as said choke coil connected to said tube to prevent said tube from flashing back due to the inductive surges generated in said choke coil.

6. In combination, an alternating current supply, a gas tube connected to said supply for rectifying alternating current therefrom, a choke coil in the output of said tube for smoothing the flow of rectified current, an auxiliary winding on the same magnetic structure as said coil, a circuit bridging said tube and including, in series, said auxiliary winding and a condenser, the capacity of said condenser being such as to render said bridge circuit substantially opaque to current of the frequency of said supply, means for at times causing a high frequency surge voltage to be generated in said choke coil and a similar voltage to be generated in said winding, said surge voltages being oppositely poled with respect to said tube and hence ineffective to produce sufficient potential difference across said tube to exceed the inverse peak voltage of said tube.

OTHO D. GRANDSTAFF.